(12) United States Patent
Tanaka et al.

(10) Patent No.: US 9,346,367 B2
(45) Date of Patent: May 24, 2016

(54) IN-VEHICLE DEVICE

(71) Applicant: Mitsubishi Electric Corporation, Chiyoda-ku, Tokyo (JP)

(72) Inventors: Kazunori Tanaka, Tokyo (JP); Kyoko Higashino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/279,798

(22) Filed: May 16, 2014

(65) Prior Publication Data

US 2015/0162699 A1 Jun. 11, 2015

(30) Foreign Application Priority Data

Dec. 11, 2013 (JP) ................................. 2013-255598

(51) Int. Cl.
*H01R 13/74* (2006.01)
*B60L 11/18* (2006.01)

(52) U.S. Cl.
CPC ....... *B60L 11/1818* (2013.01); *B60L 2270/145* (2013.01); *H01R 13/74* (2013.01); *H01R 2201/26* (2013.01)

(58) Field of Classification Search
CPC ............. H01R 2201/26; H01R 13/639; H01R 13/516; H01R 13/5213; H01R 13/518
See application file for complete search history.

(56) References Cited

U.S. PATENT DOCUMENTS

| | | | |
|---|---|---|---|
| 7,645,154 B2 * | 1/2010 | Baker et al. ................... 439/271 |
| 8,011,945 B2 * | 9/2011 | Seong .................... H01R 13/53 439/345 |
| 8,998,644 B2 * | 4/2015 | Fukaya ............... B60R 16/0207 439/623 |
| 2003/0129864 A1 * | 7/2003 | Peloza ............... H01R 12/7005 439/79 |
| 2008/0085636 A1 * | 4/2008 | Kurahashi .......... H01R 13/6608 439/620.01 |
| 2009/0221181 A1 * | 9/2009 | Langhoff ............... H01R 13/03 439/607.02 |
| 2009/0318009 A1 * | 12/2009 | McCauley ........... H01R 13/639 439/370 |

FOREIGN PATENT DOCUMENTS

| | | |
|---|---|---|
| JP | 9-55262 A | 2/1997 |
| JP | 2001-176602 A | 6/2001 |
| JP | 3977092 B2 | 9/2007 |
| JP | 2008-123913 A | 5/2008 |
| JP | 2013-4376 A | 1/2013 |

OTHER PUBLICATIONS

Communication dated Sep. 24, 2014, issued by the Japanese Patent Office in counterpart Japanese application No. 2013-255598.

* cited by examiner

*Primary Examiner* — Truc Nguyen
(74) *Attorney, Agent, or Firm* — Sughrue Mion, PLLC; Richard C. Turner

(57) ABSTRACT

An in-vehicle device includes: a terminal to which a vehicle-side connector is connected; a hood portion surrounding the terminal; a protection cover functioning with a purpose of holding or protecting constituent components of the in-vehicle device; and a damper mechanical portion formed integrally with the protection cover and installed on a periphery of the hood portion. The damper mechanical portion has an outer wall portion linked to a base portion of the protection cover and an inner wall portion spaced apart from an outer surface of the hood portion and held on an inner side of the outer wall portion.

7 Claims, 7 Drawing Sheets

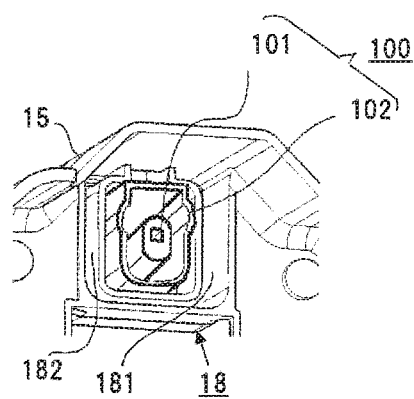
Fig. 9
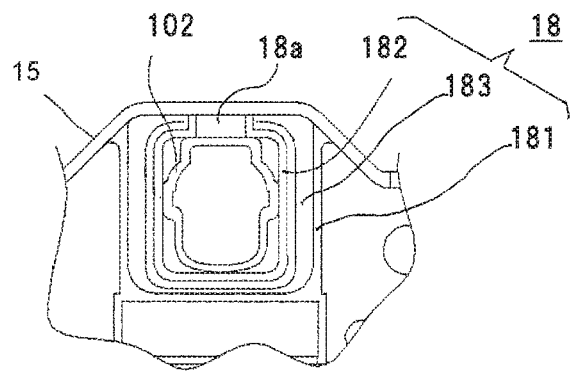
Fig. 10
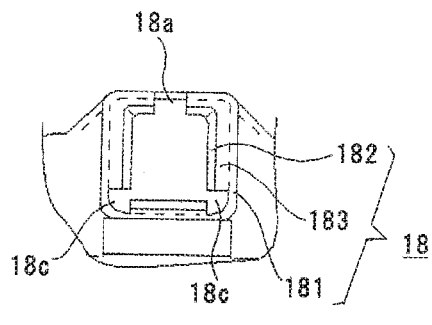 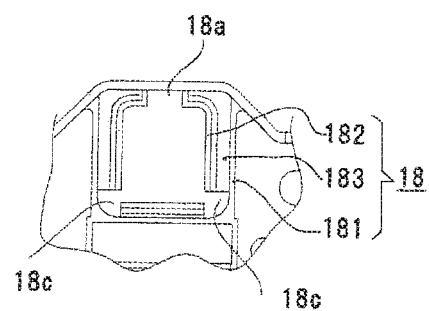
Fig. 11A                    Fig. 11B

IN-VEHICLE DEVICE

BACKGROUND OF THE INVENTION

1. Field of the Invention

The present invention relates to an in-vehicle device, such as a vehicle AC generator mounted on a vehicle and connected to a vehicle-side connector.

2. Description of the Related Art

According to a structure of a vehicle connector connection portion of an AC generator (auxiliary machine provided in an engine room) in the related art, a first housing is formed of a terminal holding portion, a tubular hood portion protruding from a front surface of the terminal holding portion toward a tip end, and a tubular regulatory portion protruding from the front surface of the terminal holding portion on a more outer peripheral side than the hood portion toward the tip end, all of which are integrated into one unit and made of a synthetic resin material with excellent heat resistance. The hood portion surrounding a tip end of a male terminal metal fitting attached to the terminal holding portion is fit in a space between a terminal storing portion provided to an engine-side connector (wire harness) and a tubular fitting portion surrounding the terminal storing portion, so that the male terminal metal fitting and a female terminal metal fitting in the terminal storing portion are connected to each other.

The tubular regulatory portion externally fits onto the tubular fitting portion all along the circumference, and thereby regulates relative displacement even when the tubular fitting portion undergoes deformation toward the outer periphery due to high temperatures. Hence, the tubular regulatory portion prevents rattling between the housing and the connector in a reliable manner (see, for example, Patent Document 1).

Also, a fitting structure is described by way of example with another connector. According to this structure, while a female connector and a male connector are properly fit together, the female connector is regulated so as not to fall off by a connector attachment plate and an electric component provided with the male connector is regulated so as not to fall off by an electric component attachment plate (instrument panel). The respective attachment plates are made of a synthetic resin material and formed by integral molding. The respective attachment plates are fit together elastically by a fitting protrusion and a recess (see, for example, Patent Document 2).

[Patent Document 1] JP-A-2013-4376
[Patent Document 2] JP-A-9-55262

In the AC generator in the related art, the tubular regulatory portion of substantially the same shape as the outer peripheral shape of the hood portion is externally fit to the tubular fitting portion all along the circumference. However, the both are fit together at a tip end of the tubular fitting portion and most (outer periphery) of the tubular fitting portion is in a free state. Vibrations that the vehicle AC generator mounted on the vehicle undergoes are considerably large depending on a model and the vehicle AC generator fails to endure the vibrations by merely fitting the resin members together. Hence, it cannot be said that fine sliding-induced wear between the terminal metal fittings is perfectly suppressed.

On the other hand, in an example in which the connector is fit to an attachment plate, because the attachment plate is large for the connector, when the connector undergoes large vibrations, it is likely that the attachment plate absorbs the vibrations.

SUMMARY OF THE INVENTION

The invention was devised to solve the problems discussed above and has an object to provide an in-vehicle device capable of maintaining a high vibration-resistant connection state with a vehicle-side connector to which the in-vehicle device is connected when mounted on a vehicle.

An in-vehicle device according to an aspect of the invention includes: a terminal to which a vehicle-side connector is connected; a hood portion surrounding the terminal; a protection cover functioning with one of purposes of holding and protecting constituent components including the terminal and the hood portion; and a damper mechanical portion formed integrally with the protection cover and installed on a periphery of the hood portion.

Also, an in-vehicle device according to another aspect of the invention includes: a terminal; a hood portion surrounding the terminal; and a protection cover functioning with one of purposes of holding and protecting constituent components including the terminal and the hood portion. A vehicle-side connector is inserted in a space between an outer peripheral surface of the hood portion and an inner surface of the protection cover, and thereby the vehicle-side connector, the terminal, and the hood portion are fit together and the vehicle-side connector is elastically held.

According to the in-vehicle devices of the invention, the damper mechanical portion is formed of a part of the protection cover installed on the periphery of the hood portion. Hence, vibrations can be absorbed in the damper mechanical portion and it becomes possible to maintain a high vibration-resistant connection state with the vehicle-side connector.

Also, the in-vehicle device of the invention is configured in such a manner that the vehicle-side connector is inserted in a space between the outer peripheral surface of the hood portion and the inner surface of the protection cover, so that the vehicle-side connector, the terminal, and the hood portion are fit together and the vehicle-side connector is elastically held. Hence, vibrations can be absorbed and it becomes possible to maintain a high vibration-resistant connection state with the vehicle-side connector.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a perspective view showing a state in which the vehicle-side connector is attached to the damper mechanical portion of the protection cover of FIG. 4 when viewed from a back side of the protection cover;

FIG. 10 is a plan view of FIG. 9;

FIG. 11A is a front view of a major portion of a protection cover of a vehicle AC generator according to a second embodiment of the invention;

FIG. 11B is a back-side view of the major portion of the protection cover of the vehicle AC generator according to the second embodiment of the invention;

DETAILED DESCRIPTION OF THE PREFERRED EMBODIMENTS

First Embodiment

Figure 1:
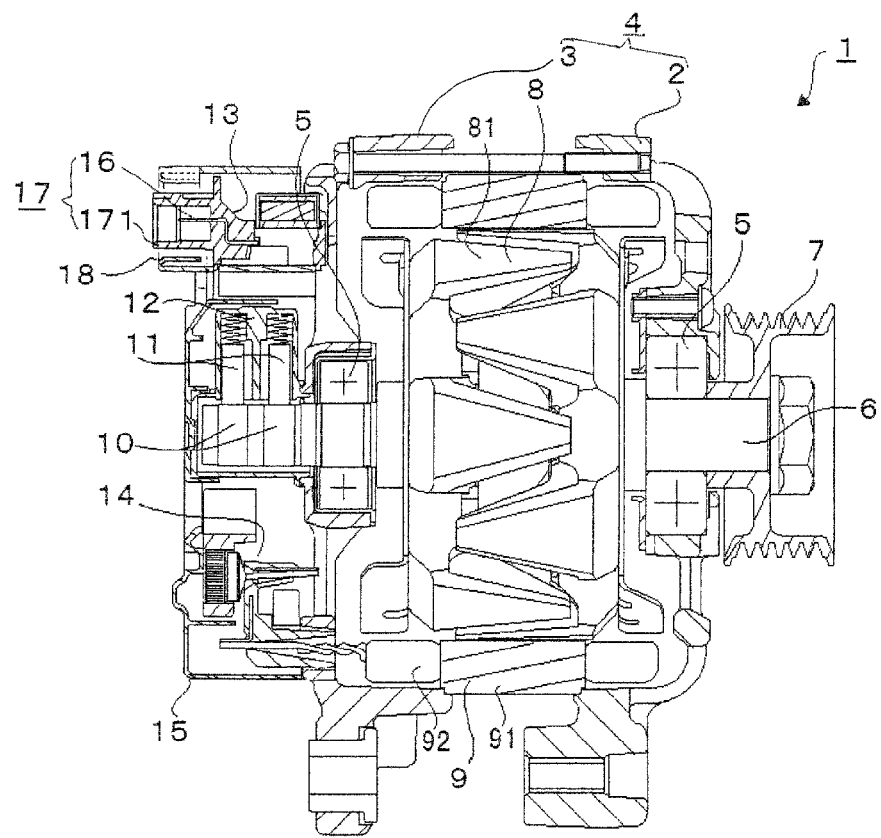
FIG. 1 is a sectional side view of a vehicle AC generator as an in-vehicle device according to a first embodiment of the invention.
Figure 2:
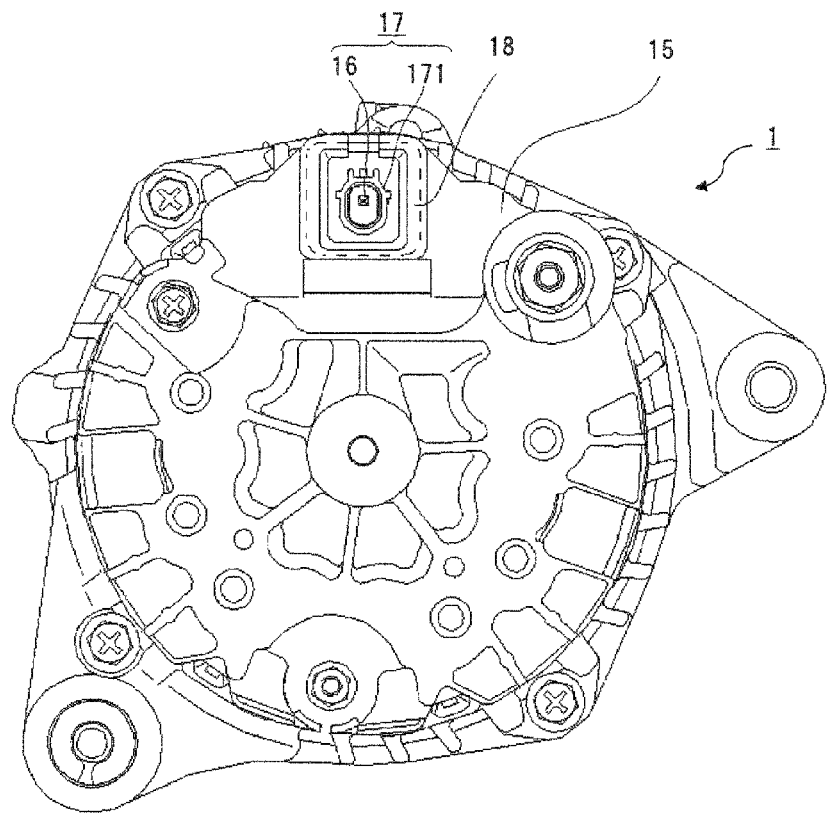
FIG. 2 is a rear view of the vehicle AC generator of FIG. 1.
Figure 3:
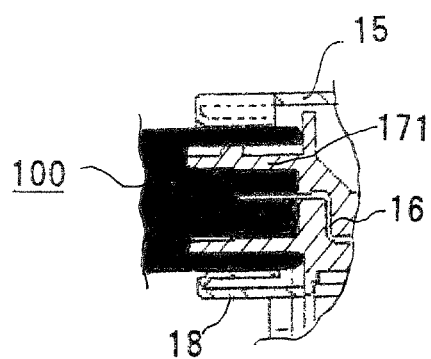
FIG. 3 is a cross section of a major portion showing a state in which a vehicle-side connector is attached to the vehicle AC generator of FIG. 1.

Hereinafter, an in-vehicle device according to a first embodiment of the invention will be described according to FIG. 1 through FIG. 10. FIG. 1 is a sectional side view showing a vehicle AC generator 1 as an example of the in-vehicle device according to the first embodiment of the invention. Referring to FIG. 1, a rear side (left of the sheet surface) of the vehicle AC generator 1 is covered with a protection cover 15 and a connector connection portion 17 to be connected to a vehicle-side connector is installed in an upper part on the rear side. FIG. 2 is a rear view of the vehicle AC generator 1 of FIG. 1 and it is also a front view when the connector connection portion 17 and its periphery are viewed in an insertion direction. Also, FIG. 3 is a cross section simply showing an attachment state of a damper mechanical portion of the invention and the vehicle-side connector. The invention is characterized in that a hood portion 171 surrounding a terminal 16 of the in-vehicle device and a damper mechanical portion 18 formed integrally with the protection cover 15 are formed so as to have a double tube structure, and a fitting portion (tubular fitting portion 102) of a vehicle-side connector 100 is elastically held in a clearance of the double tube. In this instance, an inner surface of the damper mechanical portion 18 and an outer surface of the tubular fitting portion 102 are in contact with each other and held in this state, so that vibrations are absorbed on the side of the damper mechanical portion 18.

As is shown in FIG. 1, the vehicle AC generator 1 as an example of the in-vehicle device includes a casing 4 formed of a front bracket 2 and a rear bracket 3 substantially shaped like a cup, a shaft 6 supported on the casing 4 in a rotatable manner via a pair of bearings 5, a pulley 7 firmly fixed to the shaft 6 at an end extending frontward with respect to the casing 4, a rotor 8 fixed to the shaft 6 and installed inside the casing 4, a stator 9 fixed to the casing 4 so as to surround the rotor 8, a pair of slip rings 10 fit to the shaft 6 in an extending portion extending rearward with respect to the casing 4, and a pair of brushes 11 installed so as to slide on the slip rings 10 and supplying a current to the rotor 8 from the vehicle-side connector 100.

The rotor 8 includes a field winding (not shown) generating a flux when an excitation current is flown through and a core 81 provided so as to cover the field winding and generating a magnetic pole with the flux.

The stator 9 includes a cylindrical stator core 91 and a stator winding 92 coiled around the stator core 91 and generating AC with a variance of the flux from the field winding in association with rotations of the rotor 8. The stator 9 is installed so as to surround the rotor 8 with both axial ends of the stator core 91 being pinched at opening ends of the front bracket 2 and the rear bracket 3.

The vehicle AC generator 1 includes a brush holder 12 storing the brushes 11, a voltage adjustor device 13 installed on an outer diameter side of the brush holder 12 and adjusting magnitude of an AC voltage generated at the stator 9, a rectifier device 14 formed substantially in the shape of a capital C and installed to an outer peripheral portion of the slip rings 10 in a fan shape with its center on the shaft 6 in a plane orthogonal to a shaft center of the shaft 6 and rectifying an AC voltage generated at the stator 9 to a DC voltage, and a protection cover 15 formed of a resin molded article attached to the rear bracket 3 so as to cover the brush holder 12, the voltage adjustor device 13, and the rectifier device 14. For a circuit board (not shown) of the brush holder 12, the voltage adjustor device 13, and the rectifier device 14, desired terminals functioning so as to establish electrical connections are provided by insert molding using insulating resin or the like.

Also, as is shown in the sectional side view of the vehicle AC generator 1 of FIG. 1, the voltage adjustor device 13 has a connector connection portion 17 as an integral part thereof, and is formed of a corresponding terminal 16 (terminal portion) among multiple insert terminals (not shown) provided to the voltage adjustor device 13 and a hood portion 171 formed in substantially a tubular shape by molding so as to surround and thereby protect the terminal 16. An air gap necessary for an insertion work of the vehicle-side connector 100 is secured around the connector connection portion 17. Further, the damper mechanical portion 18 is molded integrally with the protection cover 15 so as to surround the air gap and extend rearward with respect to the device.

An attachment state of the damper mechanical portion 18 and the vehicle-side connector 100 is shown simply in a cross section of FIG. 3. As is shown in the drawing, the hood portion 171 of substantially a tubular shape and the damper mechanical portion 18 of substantially a tubular shape surrounding the hood portion 171 together form a double tube structure. In a case where the vehicle-side connector 100 is inserted, an inner peripheral surface of the hood portion 171 and an outer peripheral surface of a terminal storing portion 101, which is a fitting portion of the vehicle-side connector 100 described below, and an outer peripheral surface of the hood portion 171 and an inner peripheral surface of a tubular fitting portion 102, which is a fitting portion of the vehicle-side connector 100 described below, are fit together and held in this state. Also, an outer peripheral surface of the tubular fitting portion 102, which is a fitting portion of the vehicle-side connector 100 described below, and an inner surface of the damper mechanical portion 18 are elastically held.

Figure 4:
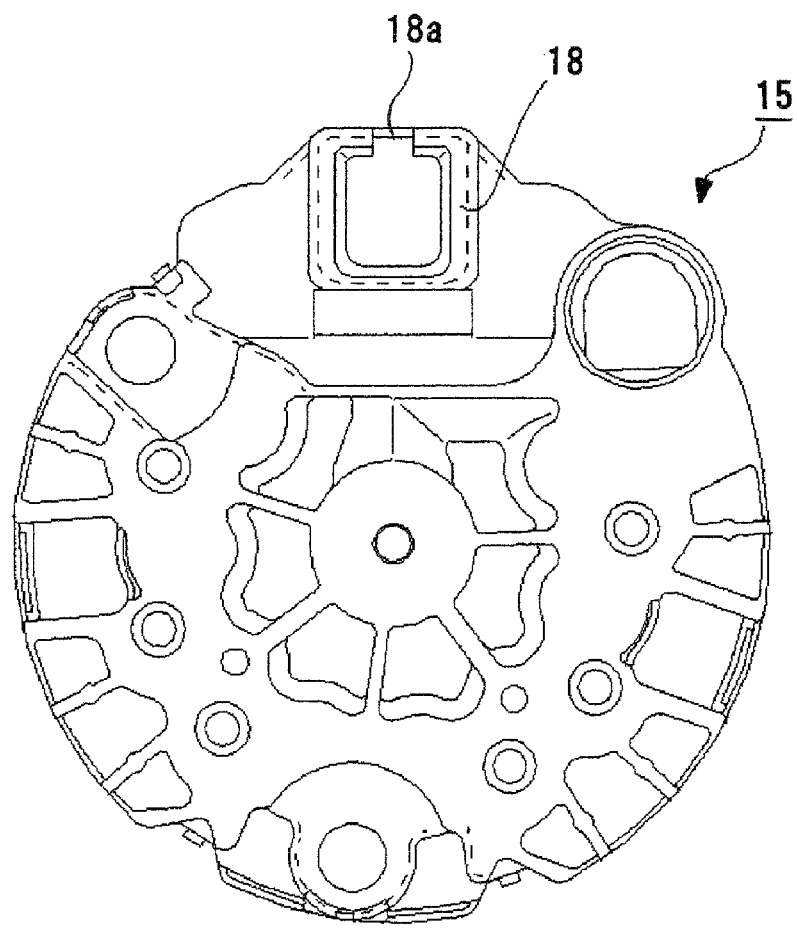
FIG. 4 is a plan view of a protection cover of the vehicle AC generator of FIG. 1.

FIG. 4 is a plan view of the protection cover 15 provided with the damper mechanical portion 18. As is shown in the drawing, the damper mechanical portion 18 is formed integrally with the protection cover 15 and a recess 18a used to adjust insertion condition of the vehicle-side connector 100 is formed in a part of the damper mechanical portion 18. The connector connection portion 17 is exposed to a portion surrounded by the damper mechanical portion 18.

Figure 5:
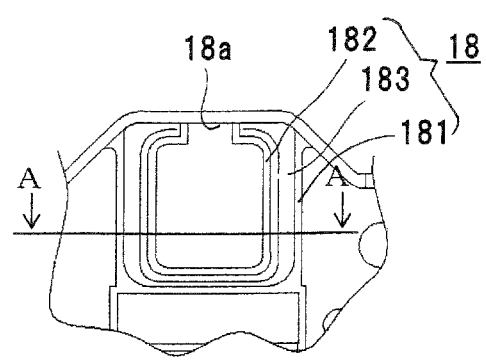
FIG. 5 is an enlarged plan view of a major portion of a damper mechanical portion of the protection cover of FIG. 4.

FIG. 5 is an enlarged plan view of a major portion of the damper mechanical portion 18 and it is also a back side view when the protection cover 15 is viewed from the cover inner side. Also, FIG. 6 is a cross section taken on the line A-A of FIG. 5 and this is a cross section of the damper mechanical portion 18 along a vehicle-side connector insertion direction.

Figure 6:
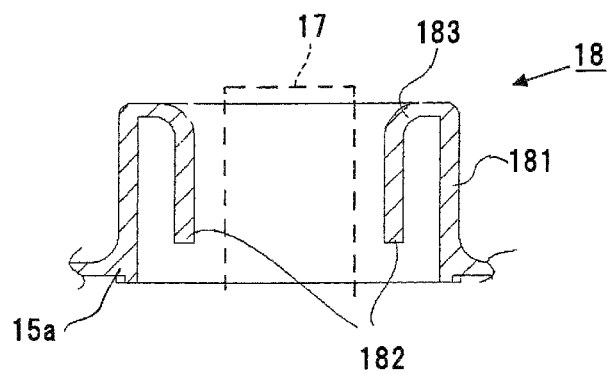
FIG. 6 is a cross section taken on the line A-A of FIG. 5.

As are shown in FIG. 5 and FIG. 6, the damper mechanical portion 18 is formed of an outer wall portion 181 provided so as to surround the connection connection portion 17 and linked to a base portion of the protection cover 15 while protruding outward from a vehicle-side connector insertion opening 15a, an inner wall portion 182 (rip portion) spaced apart from the hood portion 171 of the connection connection portion 17 and held on the inner side of the outer wall portion 181 while extending parallel to between the outer wall portion 181 and the hood portion 171, and a coupling portion 183 connecting a tip end of the outer wall portion 181 and a tip end of the inner wall portion 182. As has been described above, the damper mechanical portion 18 is formed integrally with the protection cover 15. Also, the outer wall portion 181 and the inner wall portion 182 together form the double tube structure inside the damper mechanical portion 18.

As is shown in the cross section of FIG. 6, the coupling portion 183 is formed so as to guide the vehicle-side connector 100 during insertion by making its surface round in the vicinity of the inner wall portion 182. Also, the cross section of the damper mechanical portion 18 is of substantially the shape of a capital U. The tip end of the outer wall portion 181 of the damper mechanical portion 18 is located on the outer side than the tip end of the inner wall portion 182. An amount of protrusion of the tip end of the outer wall portion 181 from the base portion of the protection cover 15 is larger than an amount of protrusion of the tip end of the inner wall portion 182.

Regarding dimensions of the respective components forming the damper mechanical portion 18, for example, a height of the outer wall portion 181 protruding from the vehicle-side connector insertion opening 15a of the protection cover 15 is about 10 to 12 mm, a radius r of the curve of the coupling portion 183 is about 2 mm, a thickness of the outer wall portion 181 and the inner wall portion 182 is about 1 to 1.5 mm, and a clearance between the outer wall portion 181 and the inner wall portion 182 is about 1.5 to 3 mm. It is needless to say that these dimensions are changed when the need arises to suit a device to which the invention is applied.

Figure 7:
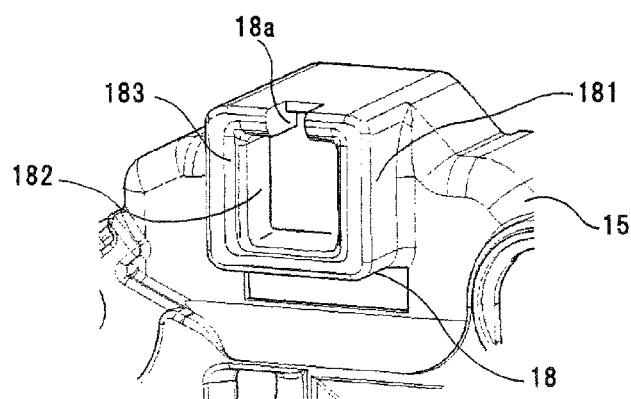
FIG. 7 is a front-side perspective view of the major portion of the damper mechanical portion according to the first embodiment of the invention.
Figure 8:
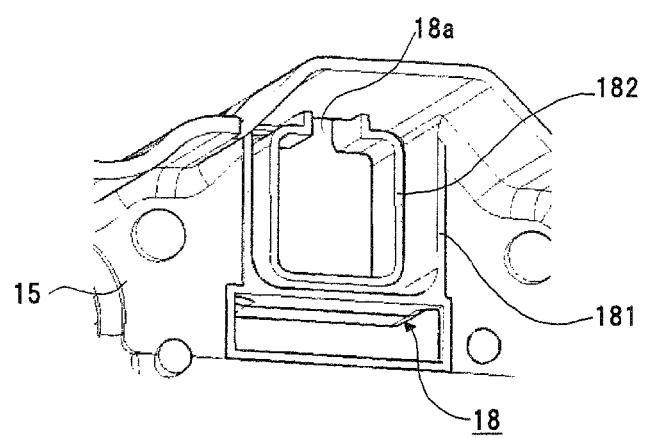
FIG. 8 is a back-side perspective view of the major portion of the damper mechanical portion according to the first embodiment of the invention.

Also, FIG. 7 is a front-side perspective view of the major portion of the damper mechanical portion 18 of the protection cover 15 and FIG. 8 is a back-side perspective view of the major portion of the damper mechanical portion 18 of the protection cover 15.

FIG. 9 is a perspective view showing a state in which the vehicle-side connector 100 is guided by the rounded portion of the damper mechanical portion 18 and attached to the damper mechanical portion 18 when viewed from the back side (inner side) of the protection cover 15. For ease of visual understanding of the fitting state, FIG. 9 shows only the periphery of the damper mechanical portion 18 of the protection cover 15. In actuality, however, forming members, such as the connector connection portion 17 of the in-vehicle device, are installed inside the protection cover 15 and fit together with the vehicle-side connector 100.

The vehicle-side connector 100 includes the terminal storing portion 101 storing the in-vehicle device terminals and the tubular fitting portion 102 surrounding the terminal storing portion 101. An outer periphery of the tubular fitting portion 102 is formed in a dimension that allows press-fit to the inner wall portion 182 of the damper mechanical portion 18.

FIG. 10 is a plan view of FIG. 9 and it is a view when the protection cover 15 is observed from the inner side (the terminal storing portion 101 of the vehicle-side connector 100 is omitted). As is shown in FIG. 10, while the tubular fitting portion 102 of the vehicle-side connector 100 is elastically held by the damper mechanical portion 18, a convex portion of the tubular fitting portion 102 is in contact with the inner wall portion 182 of the damper mechanical portion 18 in at least two opposing surfaces (both side surfaces) of the tubular fitting portion 102. The tubular fitting portion 102 of the vehicle-side connector 100 is press-fit toward the lower end (opening end side) of the inner wall portion 182 of the damper mechanical portion 18. Consequently, the vehicle-side connector 100 is held by the protection cover 15 in the configuration that absorbs vibrations. It thus becomes possible to avoid inconveniences arising from sliding-induced wear in a connection portion between the terminal 16 of the voltage adjustor device 13, which is a part of electrical connection of the vehicle AC generator 1, and the terminal storing portion 101 of the vehicle-side connector 100.

The inner wall portion 182 of the damper mechanical portion 18 is formed in a region surrounded by the outer wall portion 181. Hence, the outer wall portion 181 is furnished with not only a function of protecting the vehicle-side connector 100 but also a function of protecting the inner wall portion 182 from an external impact. The inner wall portion 182 can be therefore formed in a flexible shape that suits to exert the damper function.

As has been described, the vehicle AC generator 1 as the in-vehicle device according to the first embodiment of the invention is configured in such a manner that the damper mechanical portion 18 is formed of the protection cover 15 and vibrations are absorbed in the damper mechanical portion 18. Owing to this configuration, it becomes possible to enhance the vibration resistance.

Second Embodiment

Figure 12A:
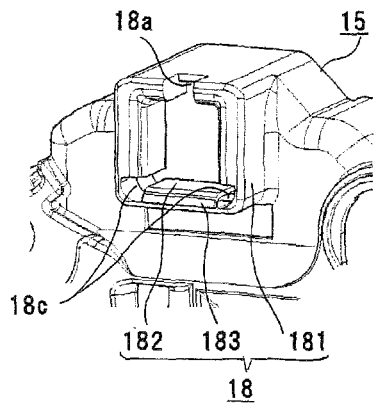
FIG. 12A is a front-side perspective view of the major portion of the protection cover of the vehicle AC generator according to the second embodiment of the invention.
Figure 12B:
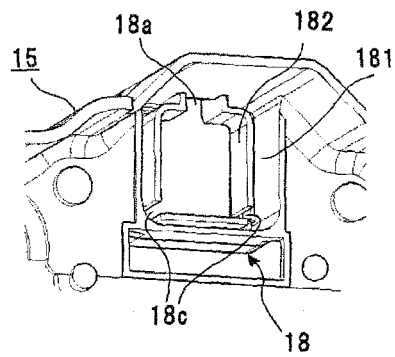
FIG. 12B is a back-side perspective view of the major portion of the protection cover of the vehicle AC generator according to the second embodiment of the invention.

FIG. 11A is a front view and FIG. 11B is a back side view of a major portion of a protection cover 15 of a second embodiment. FIG. 12A is a front-side perspective view of the major portion and FIG. 12B is a back-side perspective view of the major portion of the protection cover 15 of the second embodiment. The first embodiment above has described a case where the inner wall portion 182 of the damper mechanical portion 18 is provided substantially continuously along the connector connection portion 17. On the contrary, the inner wall portion 182 is divided to multiple parts by providing slits 18c in the second embodiment. By providing the slits 18c to the inner wall portion 182 along the vehicle-side connector insertion direction, it becomes possible to suppress cracking of the inner wall portion 182 when the vehicle-side connector 100 is press-fit or when the device is mounted on the vehicle. It thus becomes possible to avoid inconveniences, such as unwanted deformation.

FIGS. 11A and 11B and FIGS. 12A and 12B show a case where the slits 18c are provided at two points in the inner wall portion 182 of the damper mechanical portion 18 by way of example. It should be appreciated, however, that the number of formed points and dimensions of the slits 18c can be changed when the need arises to suit a device to which the invention is applied.

Third Embodiment

Figure 13:
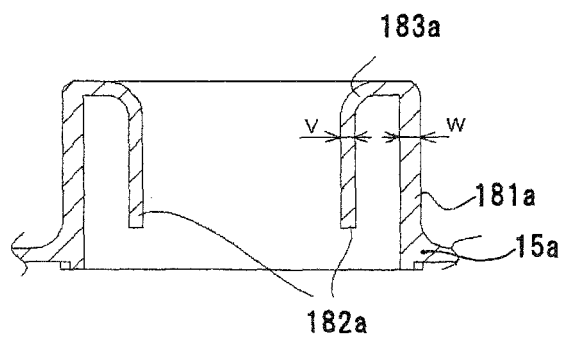
FIG. 13 is a cross section of a damper mechanical portion of a protection cover taken along a vehicle-side connector insertion direction in a vehicle AC generator according to a third embodiment of the invention.

FIG. 13 is a cross section of a damper mechanical portion 18 of a third embodiment along the vehicle-side connector insertion direction. The first embodiment above has described a case as is shown in FIG. 6 where the outer wall portion 181 and the inner wall portion 182 of the damper mechanical portion 18 have substantially the same thickness. On the contrary, the third embodiment is configured in such a manner that a thickness V of an inner wall portion 182a is smaller than a thickness W of an outer wall portion 181a and the outer wall portion 181a and the inner wall portion 182a are connected by a coupling portion 183a. Owing to this configuration, it becomes possible to suppress unwanted deflection and deformation in the outer wall portion 181a and also to obtain a higher damper effect in the inner wall portion 182a.

The configuration described above is a mere example and various other shapes are adoptable as well.

Figure 14:
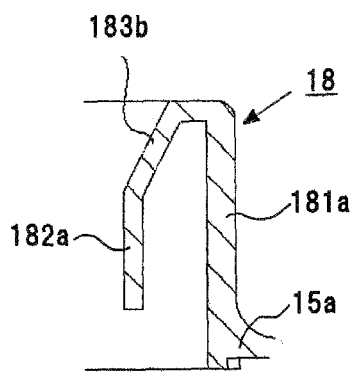
FIG. 14 is a cross section of the damper mechanical portion of the protection cover taken along the vehicle-side connector insertion direction in a vehicle AC generator according to a modification of the third embodiment of the invention.

For example, the cross section of FIG. 13 shows that the coupling portion 183a of the damper mechanical portion 18 is formed so as to have a round cross section. It should be appreciated, however, that it is also possible to adopt a taper shape considerably inclining toward the inner wall portion 182a as is shown in the cross section of FIG. 14 as the shape of the coupling portion 183b. In this case, the press-fit guiding function can be adjusted by adjusting an angle of the inclination. The press-fit guiding function can be more intensified by increasing the angle of inclination. Hence, improvements of workability during the vehicle-side connector insertion can be expected.

Also, regarding the connector connection portion 17, the single terminal 16 is provided with the rather small hood portion 171 in the first embodiment above. It should be appreciated, however, that a rather large hood portion surrounding more than one terminal having a cross section of a tubular shape or substantially an elliptical shape is also adoptable. Further, the hood portion having a cross section of a square shape, an oblong shape, a polygonal shape or any other shapes is also adoptable. In practice, the vehicle AC generator 1 maintains its versatility by making the connection connection portion 17 adaptable to the vehicle-side connector 100 of various shapes.

It goes without saying that the opening shape of the damper mechanical portion 18 provided to the protection cover 15 to insert the vehicle-side connector is not limited to the rectangular shape as is shown in the drawing and the opening can be of various shapes, such as a semi-circular shape, a long elliptical shape, and a polygonal shape.

Figure 15:
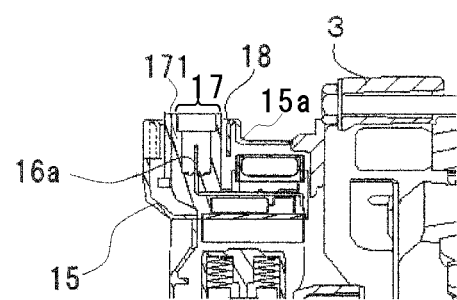
FIG. 15 is a sectional side view of a major portion showing another example of a connector connection portion of the vehicle AC generator.

FIG. 15 is a sectional side view of a major portion of the vehicle AC generator showing another example of the connector connection portion provided to the in-vehicle device. The first embodiment above has described a case where the connector connection portion 17 and the vehicle-side connector insertion opening 15a are formed on the front side of the protection cover 15 (left in the sheet surface of FIG. 1 and the rear side of the vehicle AC generator 1) according to a layout of the vehicle wiring. It is, however, also possible to install, as is shown in FIG. 15, the connector connection portion 17 and the vehicle-side connector insertion opening 15a on the side surface side of the protection cover 15 (upper side in the sheet surface of FIG. 15 and on the outer peripheral surface side of the vehicle AC generator 1) in alignment with a direction of the terminal 16a. In short, it is needless to say that the locations of the connector connection portion 17 and the vehicle-side connector insertion opening 15a can be changed appropriately when the need arises according to a device to which the invention is applied.

It should be appreciated that the respective embodiments of the invention can be combined without any restriction within the scope of the invention and the respective embodiments can be modified and omitted as the need arises.

Various modifications and alterations of this invention will be apparent to those skilled in the art without departing from the scope and spirit of this invention, and it should be understood that this is not limited to the illustrative embodiments set forth herein.

What is claimed is:
1. An in-vehicle device, comprising:
a terminal to which a vehicle-side connector is connected;
a hood portion surrounding the terminal;
a protection cover functioning with one of purposes of holding and protecting constituent components including the terminal and the hood portion; and
a damper mechanical portion formed integrally with the protection cover and installed around the hood portion,
wherein the vehicle-side connector includes a terminal storing portion storing in-vehicle device terminals and a tubular fitting portion surrounding the terminal storing portion, the tubular fitting portion being inserted in a space between an outer peripheral surface of the hood portion and an inner surface of the damper mechanical portion, and the tubular fitting portion being press-fit toward the damper mechanical portion.
2. The in-vehicle device according to claim 1, wherein:
the damper mechanical portion has an outer wall portion linked to a base portion of the protection cover and an inner wall portion spaced apart from the hood portion and held on an inner side of the outer wall portion.
3. The in-vehicle device according to claim 2, wherein:
the damper mechanical portion has a coupling portion that connects a tip end of the outer wall portion and a tip end of the inner wall portion.
4. The in-vehicle device according to claim 3, wherein:
the tip end of the outer wall portion of the damper mechanical portion is located on an outer side than the tip end of the inner wall portion.
5. The in-vehicle device according to claim 4, wherein:
the coupling portion of the damper mechanical portion has a surface which is formed to be round in a vicinity of the inner wall portion.
6. The in-vehicle device according to claim 2, wherein:
the inner wall portion of the damper mechanical portion is provided with a slit along a vehicle-side connector insertion direction.
7. The in-vehicle device according to claim 2, wherein:
the inner wall portion of the damper mechanical portion is formed of a member thinner than a member forming the outer wall portion.

* * * * *